(12) United States Patent
Zhou et al.

(10) Patent No.: US 12,335,180 B2
(45) Date of Patent: Jun. 17, 2025

(54) COMMUNICATION METHOD AND APPARATUS FOR SYNCHRONIZATION SIGNAL BLOCKS, DEVICE, AND STORAGE MEDIUM

(71) Applicant: Spreadtrum Communications (Shanghai) Co., Ltd., Shanghai (CN)

(72) Inventors: Huayu Zhou, Shanghai (CN); Zhengang Pan, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 361 days.

(21) Appl. No.: 17/904,226

(22) PCT Filed: Feb. 7, 2021

(86) PCT No.: PCT/CN2021/075726
§ 371 (c)(1),
(2) Date: Aug. 15, 2022

(87) PCT Pub. No.: WO2021/160059
PCT Pub. Date: Aug. 19, 2021

(65) Prior Publication Data
US 2023/0091088 A1    Mar. 23, 2023

(30) Foreign Application Priority Data
Feb. 14, 2020   (CN) .......................... 202010093402.6

(51) Int. Cl.
*H04L 27/26*    (2006.01)
*H04L 5/00*     (2006.01)
*H04W 48/08*    (2009.01)

(52) U.S. Cl.
CPC ........ *H04L 5/0048* (2013.01); *H04L 27/2655* (2013.01); *H04W 48/08* (2013.01)

(58) Field of Classification Search
CPC ............... H04L 27/2655; H04L 5/0048; H04L 27/2613; H04L 27/2692; H04L 5/0023; H04W 48/08; H04W 48/16
See application file for complete search history.

(56) References Cited

U.S. PATENT DOCUMENTS

2021/0297968 A1    9/2021  Alriksson et al.
2021/0377890 A1*  12/2021  Shen ................. H04W 72/0446

FOREIGN PATENT DOCUMENTS

CN    108092754 A    5/2018
CN    110235477 A    9/2019
(Continued)

OTHER PUBLICATIONS

International Search Report and Written Opinion mailed in International Application PCT/CN2021/075726 on Apr. 25, 2021.
(Continued)

*Primary Examiner* — Gbemileke J Onamuti
*Assistant Examiner* — Natali Pascual Peguero
(74) *Attorney, Agent, or Firm* — Kilpatrick Townsend & Stockton LLP

(57) ABSTRACT

The present disclosure provides a communication method, including: acquiring a first Q value or a second Q value, determining, based on the first Q value or the second Q value, whether two or more than two synchronization signal blocks have a quasi co-location relationship, or determining a synchronization signal block index of a synchronization signal block.

17 Claims, 3 Drawing Sheets

Acquiring a second Q value based on master information block indication information; and/or, acquiring a first Q value based on system information block indication information — S301

Determining, based on the first Q value or the second Q value, whether two or more than two synchronization signal blocks have a quasi co-location relationship, or determining a synchronization signal block index of a synchronization signal block — S302

(56) References Cited

FOREIGN PATENT DOCUMENTS

| | | |
|---|---|---|
| CN | 110249582 A | 9/2019 |
| CN | 111314260 A | 6/2020 |
| WO | 2018172987 A | 9/2018 |
| WO | 2020030675 A1 | 2/2020 |

OTHER PUBLICATIONS

The first Office Action received in corresponding Chinese application 202010093402.6 on Jul. 5, 2022.

* cited by examiner

COMMUNICATION METHOD AND APPARATUS FOR SYNCHRONIZATION SIGNAL BLOCKS, DEVICE, AND STORAGE MEDIUM

CROSS-REFERENCE TO RELATED APPLICATIONS

This application is a National Stage of International Application No. PCT/CN2021/075726, filed on Feb. 7, 2021, which claims priority to Chinese Application No. 202010093402.6, filed on Feb. 14, 2020, both of the applications are incorporated herein by reference.

TECHNICAL FIELD

Embodiments of the present disclosure relates to the field of communication technologies and, in particular, to a communication method and apparatus, a device, and a storage medium.

BACKGROUND

In an unlicensed spectrum, due to limited power spectrum density (Power Spectrum Density, PSD), it is difficult to use more and narrower beams to satisfy a coverage requirement. Therefore, a base station often needs to perform beam repetition to improve the coverage of a synchronization signal block.

In a related art, a base station may notify a user equipment of beam repetition information of synchronization signal blocks through signaling.

SUMMARY

A first aspect of the present disclosure provides a communication method applied to a user equipment UE, including:
  acquiring a first Q value or a second Q value;
  determining, based on the first Q value or the second Q value, whether two or more than two synchronization signal blocks have a quasi co-location relationship, or determining a synchronization signal block index of a synchronization signal block.

A second aspect of the present disclosure provides a communication apparatus applied to a user equipment UE, where the apparatus includes:
  an acquiring module, configured to acquire a first Q value or a second Q value;
  a processing module, configured to determine, based on the first Q value or the second Q value, whether two or more than two synchronization signal blocks have a quasi co-location relationship, or determine a synchronization signal block index of a synchronization signal block.

A third aspect of the present disclosure provides an electronic device, including: a memory and a processor; where the memory has stored thereon a computer program, and the processor is configured to call the computer program in the memory to perform the method according to any item of the first aspect.

A fourth aspect of the present disclosure provides a storage medium in which a computer program is stored, where the computer program is configured to implement the method according to the first aspect.

DESCRIPTION OF EMBODIMENTS

Figure 1:
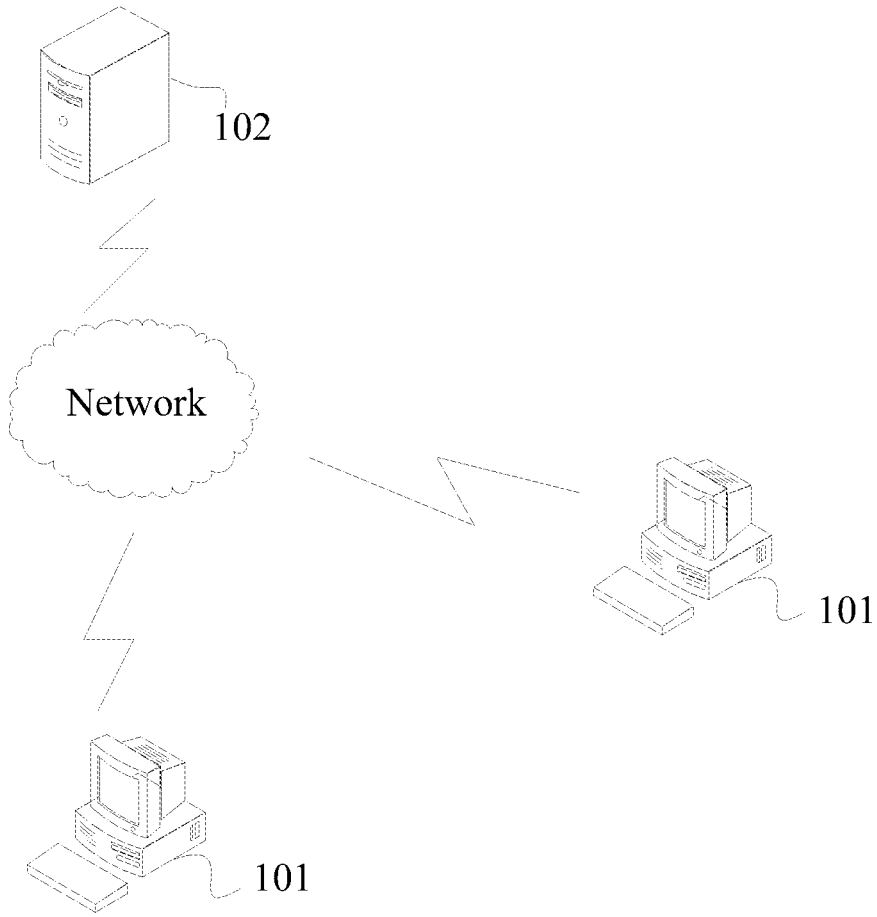
FIG. 1 is a schematic diagram of a transmission system architecture of a user equipment and a network device according to an embodiment of the present disclosure.

In order to describe the objective, technical solutions and advantages of the present disclosure more clearly, the technical solutions of embodiments of the present disclosure will be described hereunder clearly and comprehensively in conjunction with the accompanying drawings of the embodiments of the present disclosure. Obviously, the described embodiments are some of, rather than all of the embodiments of the present disclosure. Based on the embodiments in the present disclosure, all other embodiments obtained by those of ordinary skill in the art without creative efforts shall fall within the protection scope of present disclosure.

Generally, a base station may notify a user equipment of beam repetition information of synchronization signal blocks through signaling, so that the user equipment, when taking a measurement, knows which synchronization signal blocks have measurement values to be averaged (only measurement values of synchronization signal blocks which are transmitted using a same beam should be averaged), and the base station may also acquire more PDCCH transmission occasions associated with the synchronization signal blocks. However, when the number of synchronization signal blocks is relatively large, an amount of beam repetition information of the synchronization signal blocks is relatively large, and signaling overhead is high.

Embodiments of the present disclosure provide a communication method and apparatus, a device and a storage medium, so as to solve a problem in the related art that monitoring complexity of an initial access for a user equipment is high when there are many synchronization signal blocks.

In order to solve the above problem, embodiments of the present disclosure provide a communication method and apparatus, a device and a storage medium to allow for: acquiring a first Q value or a second Q value; determining, based on the first Q value or the second Q value, whether two or more than two synchronization signal blocks have a quasi co-location (Quasi Co-Location, QCL) relationship, or determining a synchronization signal block index of a synchronization signal block. Having a quasi co-location relationship means that multiple signals have a same average gain (average gain), have a QCL-TypeA relationship and have a QCL-TypeD relationship. Generally speaking, having a quasi co-location type A relationship means that two signals have a same average delay (average delay), delay spread (delay spread), Doppler shift (Doppler shift) and Doppler spread (Doppler spread); having a quasi co-location type D relationship means that that two signals have a same spatial Rx parameter (Spatial Rx parameter). Multiple signals having a quasi co-located relationship is also referred to as multiple signals being quasi co-located (Quasi Co-Located, QCLed). Multiple signals having a quasi co-located relationship may also be referred to as multiple signals being repeatedly transmitted. Multiple signals having a quasi co-located relationship may also be referred to as multiple signals being transmitted using a same beam. It should be noted that the synchronization signal block index (SS/PBCH block index) refers to an index of a beam corresponding to a synchronization signal block. If multiple synchronization signal blocks have a QCL relationship, a UE needs to monitor a PDCCH (Type0-PDCCH) monitoring occasion associated with them. A same synchronization signal block index indicates a same beam, a repeated transmission, or having a quasi co-located relationship. In embodiments of the present disclosure, a user equipment is enabled to accurately learn beam repetition information when there are many candidate synchronization signal block locations, and signaling overhead is reduced, thereby solving the problem in the related art that the signaling overhead is high when there are many synchronization signal blocks.

FIG. 1 is a schematic diagram of a transmission system architecture of a user equipment and a network device according to an embodiment of the present disclosure. As shown in FIG. 1, a UE 101 may refer to a user equipment, an access terminal, a subscriber unit, a user station, a mobile station, a mobile station (mobile station, abbreviated as MS), a remote station, a remote terminal, a mobile device, a terminal equipment (terminal equipment), a wireless communication device, a user agent or a user apparatus in various forms. It may also be a cellular phone, a cordless phone, a session initiation protocol (Session Initiation Protocol, abbreviated as SIP) phone, a wireless local loop (Wireless Local Loop, abbreviated as WLL) station, a personal digital assistant (Personal Digital Assistant, abbreviated as PDA), a handheld or compute device with wireless communication capabilities, or other processing device connected to a wireless modem, an on-vehicle device, a wearable device, a terminal device in a future 5G network or a terminal device in a future evolutional public land mobile network (Public Land Mobile Network, abbreviated as PLMN) or the like, which is not limited in the embodiments of the present disclosure, as long as the UE 101 can wirelessly communicate with a network device 102. The network device 102, i.e., a public mobile communication network device, is an interface device for the UE 101 to access the Internet, and is also a form of a radio station which refers to a radio transceiver station that performs information transmission with the UE 101 in a certain radio coverage area, including a base station (base station, abbreviated as BS), also referred to as a base station equipment, which is a device deployed in a radio access network (RAN) to provide wireless communication functions. For example, a device that provides base station functions in a 2G network includes a base transceiver station (base transceiver station, abbreviated as BTS), a device that provides base station functions in a 3G network includes a node B (NodeB), and a device that provides base station functions in a 4G network includes an evolved node B (evolved NodeB, eNB), a device that provides base station functions in a wireless local area network (wireless local area network, abbreviated as WLAN) is an access point (access point, abbreviated as AP), a device that provides base station functions in 5G NR, a gNB and a next generation eNodeB (ng-eNB), where the gNB communicates with a UE using NR technologies, the ng-eNB communicates with the UE using evolved universal terrestrial radio access network (Evolved Universal Terrestrial Radio Access, abbreviated as E-UTRA) technologies, and the gNB and the ng-eNB are both connectable to a 5G core network. The base station in the embodiments of the present disclosure further includes a device that provides base station functions in a new communication system in the future, or the like. In the embodiments of the present disclosure, the UE 101 is communicatively connected to the network device 102 via a wireless communication network, and the method for multi-cell data transmission in the embodiments of the present disclosure may be performed by the UE 101, or by the network device 102, or by the UE 101 and the network device 102 jointly. For example, in some embodiments, the network device 102 transmits notification information to the UE 101; on receiving the notification information, the UE 101 performs a corresponding task based on the notification information.

Figure 2:
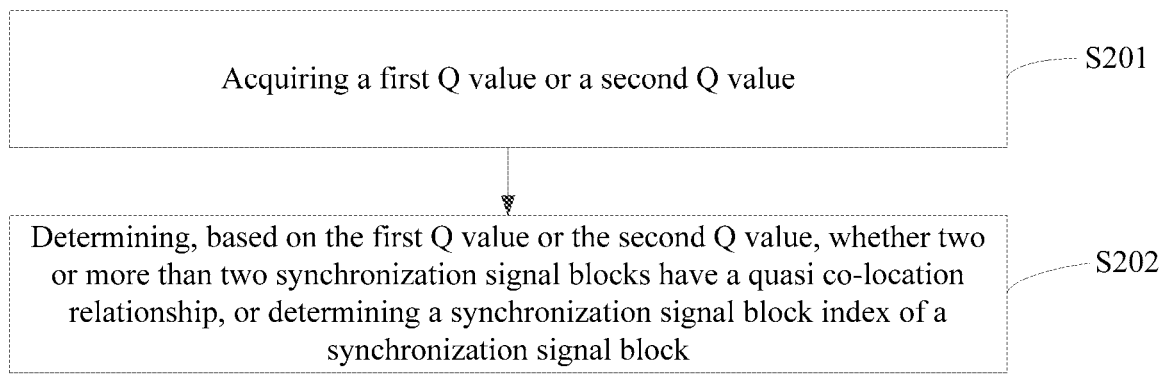
FIG. 2 is a schematic flowchart of a communication method according to a first embodiment of the present disclosure.

FIG. 2 is a schematic flowchart of a communication method according to a first embodiment of the present disclosure. As shown in FIG. 2, the method in the embodiment may include:

S201, acquiring a first Q value or a second Q value.

In the embodiment, the first Q value belongs to a first set. An element contained in the first set is a candidate value or any possible value of the first Q value. The element contained in the first set is preset. The second Q value belongs to a second set. An element contained in the second set is a candidate value or any possible value of the second Q value. The element contained in the second set is preset.

Generally, a base station transmits synchronization signal blocks in a beam sweeping (beam sweeping) manner, that is, the base station transmits the synchronization signal blocks in different time domain locations through different beams. Accordingly, a user equipment can measure the different beams and sense through which beam a strongest signal is received.

For example, the first Q value belongs to the first set, and the second set is a subset or a complete set of the first set.

For example, the second set at least contains: a maximum element in the first set, or a half of a maximum element in the first set. The maximum element in the first set is mostly likely a maximum possible Q value, which may represent a maximum number of beams, a commonly used configuration in network deployments. The half of the maximum element in the first set may represent a half of the maximum number of beams, which is also a commonly used configuration in network deployments.

For example, in Rel-15 NR (Release-15 New Radio), synchronization signals and a broadcast channel consist of a synchronization signal block, thereby introducing the function of beam sweeping. Through a primary synchronization signal (Primary Synchronization Signal, PSS) and a secondary synchronization signal SSS (Secondary Synchronization Signal, SSS), a user equipment acquires time-frequency synchronization of a cell and acquires a physical layer cell ID of the cell. This process is generally referred to as a cell search (cell search). A PSS, an SSS and a physical broadcast channel (Physical Broadcast Channel, PBCH) consist of a synchronization signal block (SS/PBCH block). Each synchronization signal block has a predetermined time domain location. This time domain location may also be referred to as a candidate synchronization signal block. Multiple synchronization signal blocks consist of a synchronization signal burst (SS-burst) or a synchronization signal block burst (SS/PBCH block burst). Multiple synchronization signal blocks consist of a synchronization signal burst, and multiple synchronization signal bursts consist of an SSburst-set (synchronization signal burst set) or a synchronization signal block burst set (SS/PBCH block set). Time domain locations of Lmax synchronization signal blocks are fixed in a 5 ms window. Time domain location indices of the Lmax synchronization signal blocks are arranged consecutively from 0 to Lmax-1. Therefore, the transmission time of a synchronization signal block in this 5 ms window is fixed, and the index is also fixed.

For example, remaining minimum system information (Remaining Minimum System Information, RMSI) in Rel-15 NR includes primary system information except MIB. The RMSI may also be referred to as SIB1. The RMSI is carried in a PDSCH, and the PDSCH is scheduled by a PDCCH. The PDSCH carrying the RMSI is generally referred to as an RMSI PDSCH, and the PDCCH that schedules the RMSI PDSCH is generally referred to as an RMSI PDCCH. An RMSI PDCCH monitoring occasion and a synchronization signal block has an association. A UE acquires the association based on an RMSI PDCCH monitoring occasion table. In an initial access process, if a certain synchronization signal block is searched by the UE, the UE determines an RMSI PDCCH time domain location (a starting symbol index or the first symbol index) associated with the synchronization signal block based on a row index of a table indicated by a PBCH, and thus, it can fulfill detection of the RMSI PDCCH, and receive and decode the RMSI PDSCH based on the RMSI PDCCH schedule.

S202, determining, based on the first Q value or the second Q value, whether two or more than two synchronization signal blocks have a quasi co-location relationship, or determining a synchronization signal block index of a synchronization signal block.

In the embodiment, determining whether the two or more than two synchronization signal blocks have a quasi co-location relationship includes: determining that modulus values of candidate synchronization signal block indices (Candidate SS/PBCH block index) of the two or more than two synchronization signal blocks by the first Q value or the second Q value are equal, or remainders of the candidate synchronization signal block indices of the two or more than two synchronization signal blocks divided by the first Q value or the second Q value are equal, where the first Q value or the second Q value is a parameter provided by a higher level, which indicates a QCL relationship of the synchronization signal blocks.

In the embodiment, determining a synchronization signal block index of a synchronization signal block includes: the synchronization signal block index of the synchronization signal block being equal to a modulus value of a candidate synchronization signal block index of the synchronization signal block by the first Q value or the second Q value; or the synchronization signal block index of the synchronization signal block being equal to a remainder of a candidate synchronization signal block index of the synchronization signal block divided by the first Q value or the second Q value.

In an NR licensed spectrum (also known as unshared spectrum access), a UE acquires timing information within 5 milliseconds by acquiring a candidate synchronization signal block index. In the licensed spectrum, the candidate synchronization signal block index is related to L candidate locations of a synchronization signal block. When L=4, two least significant bits (2 LSBs) of the candidate synchronization signal block index are carried in a PBCH-DMRS (PBCH Demodulation Reference Signal); when L>4, three least significant bits (3 LSBs) of the candidate synchronization signal block index are carried in a PBCH-DMRS; when L=64, three most significant bits (3 MSBs) of the candidate synchronization signal block index are carried in a PBCH payload (payload) or an MIB. At this time, a number of candidate synchronization signal block indices is equal to a number of synchronization signal block indices.

In an NR unlicensed spectrum (also known as shared spectrum access), a UE acquires timing information within 5 milliseconds by acquiring a candidate synchronization signal block index. In the unlicensed spectrum, candidate synchronization signal blocks within a half frame are numbered in the order from 0 to Lmax-1. When the subcarrier spacing of a synchronization signal block is 15 kHz, Lmax=10; when the subcarrier spacing of a synchronization signal block is 30 kHz, Lmax=20. The UE determines three LSBs of a candidate synchronization signal block index in a half frame through an index of a PBCH DMRS sequence (one-to-one mapping). For Lmax=10, the UE determines one MSB bit of a candidate synchronization signal block index in a half frame through a PBCH payload bit $\bar{a}_{\bar{A}+7}$. For Lmax=20, the UE determines two MSB bits of a candidate synchronization signal block index in a half frame through PBCH payload bits $\bar{a}_{\bar{A}+6}$, $\bar{a}_{\bar{A}+7}$. It is noted that in the NR unlicensed spectrum, a candidate synchronization signal block index is different from a synchronization signal block index. The candidate synchronization signal block index represents an index of a synchronization signal block on a candidate location, and the synchronization signal block index represents a beam index of a synchronization signal block. At this time, a number of candidate synchronization signal block indices may be greater than a number of synchronization signal block indices. The synchronization signal block may be a synchronization signal block in a window (such as a discovery burst transmission window), in this way, the number of candidate synchronization signal block indices may be less, so as to reduce the complexity for the UE.

In the embodiment, by means of acquiring a first Q value or a second Q value; determining, based on the first Q value or the second Q value, whether two or more than two candidate synchronization signal block indices satisfy a preset condition; and if the preset condition is satisfied, determining that two or more than two candidate synchronization signal blocks have a quasi co-location relationship, the embodiments of the present disclosure allows a user equipment to accurately learn beam repetition information when there are many candidate synchronization signal block locations, and signaling overhead is reduced, thereby solving the problem in the related art that the signaling overhead is relatively high when there are many synchronization signal blocks.

Figure 3:
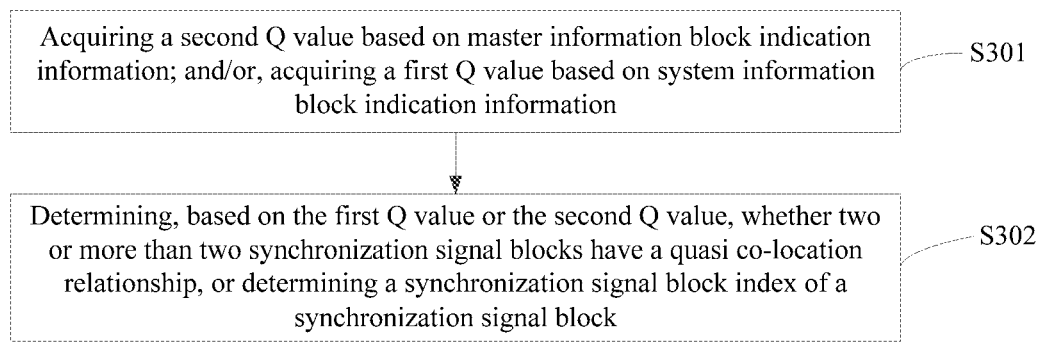
FIG. 3 is a schematic flowchart of a communication method according to a second embodiment of the present disclosure.

FIG. 3 is a schematic flowchart of a communication method according to a second embodiment of the present disclosure. As shown in FIG. 3, the method in the embodiment may include:

S301, acquiring a second Q value based on master information block (Master Information Block, MIB) indication information; and/or, acquiring a first Q value based on system information block (System Information Block 1, SIB1) indication information.

For example, the MIB indication information indicates which second Q value in a second set for a user equipment to use. Specifically, the MIB indication information is an index value of the second Q value in the second set. In this way, signaling overhead can be reduced. Further, the MIB indication information is 2 bits, indicating possible 4 index values of the second Q value in the second set.

For example, the SIB1 indication information indicates which first Q value in a first set for the user equipment to use. Specifically, the SIB1 indication information is an index value of the first Q value in the first set. In this way, signaling overhead can be reduced.

For example, the user equipment can acquire the second Q value based on the MIB indication information, and acquire the first Q value based on the SIB1 indication information. Generally speaking, the SIB1 carries more information than the MIB does. In this way, the UE acquires a rough Q value through the MIB, and further acquires a more accurate Q value through the SIB1.

For example, the second set is a subset or a complete set of the first set. When the second set is a subset of the first set, the UE acquires a Q value in the subset through the MIB, and further acquires a Q value in the complete set through the SIB1. In this case, the SIB1 provides a larger amount of information.

For example, the first Q value is less than or equal to the second Q value. In this way, after the UE acquires the rough Q value through the MIB, the number of synchronization signal blocks with beam repetition derived by the UE is less than the actual number of synchronization signal blocks, therefore, the UE can only average the measurement values conservatively and monitor fewer PDCCH monitoring occasions. This will result in slightly lower system performance, however, a state duration before the SIB is acquired is relatively short, thus, the effect is mild. On the other hand, it is beneficial to the UE that the complexity of measurement and PDCCH monitoring is relatively low before the UE acquires the SIB1.

For example, the first Q value is a factor of the second Q value. In other words, the second Q value is an integral multiple of the first Q value. In this way, if the two or more synchronization signal blocks are determined to have a QCL relationship based on the second Q value, they are also determined to have a QCL relationship based on the first Q value, which is conducive to maintaining system performance.

For example, when a maximum element in the second set is M, the second Q value includes: M/8, M/4, M/2 or M, where a value of M is any one of 16, 32 and 64. Such selection of elements in the second set is typical, which can be applied to a scenario with an exemplary amount of beams.

For example, the maximum element in the second set may include any one of 16, 32 and 64.

For example, when the maximum element in the second set is 16, the second Q value includes: 2, 4, 8 and 16.

For example, when the maximum element in the second set is 32, the second Q value includes: 4, 8, 16 and 32.

For example, when the maximum element in the second set is 64, the second Q value includes: 8, 16, 32 and 64.

For example, the maximum element in the second set may also include any one of 12, 18, 20, 24, 36, 48 and 60. The following corresponding selections of elements in the second set are applicable to an scenario with an exemplary amount of beams.

For example, when the maximum element in the second set is 12, the second Q value includes: 2, 3, 6 and 12.

For example, when the maximum element in the second set is 18, the second Q value includes: 2, 4, 9 and 18; or, the second Q value includes: 3, 6, 9 and 18.

For example, when the maximum element in the second set is 20, the first Q value includes: 2, 5, 10 and 20; or, the second Q value includes: 2, 4, 10 and 20.

For example, when the maximum element in the second set is 24, the second Q value includes: 3, 6, 12 and 24; or, the second Q value includes: 2, 4, 12 and 24.

For example, when the maximum element in the second set is 36, the second Q value includes: 4, 9, 18 and 36; or, the second Q value includes: 2, 6, 18 and 36.

For example, when the maximum element in the second set is 48, the second Q value includes: 6, 12, 24 and 48; or, the second Q value includes: 4, 12, 24 and 48.

For example, when the maximum element in the second set is 60, the second Q value includes: 6, 15, 30 and 60; or, the second Q value includes: 10, 20, 30 and 60.

For example, each element in the first set is a factor of the maximum element in the first set (the maximum element in the first set is an integer multiple of an element in the first set). The elements in the first set are selected in such a manner that they are all of the factors of the maximum element, which is conducive to beam grouping, that is, there are an integer number of beam groups for any first Q value.

Further, each element in the first set is a factor of the maximum element in the first set, and the maximum element in the first set equals to the maximum value of a time index carried in a PBCH DMRS. In this way, a modulus value of a candidate synchronization signal block index by the first Q value is equivalent to a modulus value of a time index in a PBCH DMRS sequence by the first Q value. Therefore, if modulus values of time indices in PBCH DMRS sequences of two synchronization signal blocks by the first Q value are equal, the two synchronization signal blocks have a QCL relationship. This is advantageous in that a UE does not need to decode a PBCH payload when acquiring a QCL relationship of synchronization signal blocks of a neighbouring cell, but instead, only needs to detect a time index in a PBCH DMRS sequence, thereby reducing complexity for the UE.

For example, when the maximum element in the first set is 16, the first Q value includes: 1, 2, 4, 8 and 16.

For example, when the maximum element in the first set is 32, the first Q value includes: 1, 2, 4, 8, 16 and 32.

For example, when the maximum element in the first set is 64, the first Q value includes: 1, 2, 4, 8, 16, 32 and 64.

For example, when the maximum element in the first set is 12, the first Q value includes: 1, 2, 3, 4, 6 and 12.

For example, when the maximum element in the first set is 18, the first Q value includes: 1, 2, 3, 6, 9 and 18.

For example, when the maximum element in the first set is 20, the first Q value includes: 1, 2, 4, 5, 10 and 20.

For example, when the maximum element in the first set is 24, the first Q value includes: 1, 2, 3, 4, 6, 8, 12 and 24.

For example, when the maximum element in the first set is 36, the first Q value includes: 1, 2, 3, 4, 6, 9, 12, 18 and 36.

For example, when the maximum element in the first set is 48, the first Q value includes: 1, 2, 3, 4, 6, 8, 12, 24 and 48.

For example, when the maximum element in the first set is 60, the first Q value includes: 1, 2, 3, 4, 5, 6, 10, 15, 20, 30 and 60.

S302, determining, based on the first Q value or the second Q value, whether two or more than two synchronization signal blocks have a quasi co-location relationship, or determining a synchronization signal block index of a synchronization signal block.

In the embodiment, for the specific implementation principle and implementation process of step S302, reference is made to the corresponding description as shown in step S202 in FIG. 2, which will not be repeated here.

In the embodiment, by means of acquiring a first Q value or a second Q value, determining, based on the first Q value or the second Q value, whether two or more than two synchronization signal blocks have a quasi co-location relationship, or determining a synchronization signal block index of a synchronization signal block, the embodiments of the present disclosure allow a user equipment to accurately learn beam repetition information when there are many candidate synchronization signal block locations, and signaling overhead is reduced, thereby solving the problem in the related art the signaling overhead is relatively high when there are many synchronization signal blocks.

Figure 4:
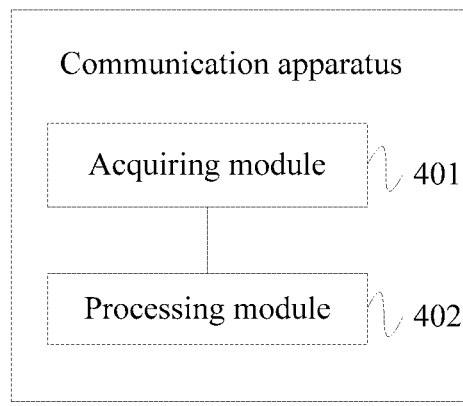
FIG. 4 is a schematic structural diagram of a communication apparatus according to a third embodiment of the present disclosure.

FIG. 4 is a schematic structural diagram of a communication apparatus according to a third embodiment of the present disclosure. As shown in FIG. 4, the apparatus in the embodiment may include:

an acquiring module 401, configured to acquire a first Q value or a second Q value;

a processing module 402, configured to determine, based on the first Q value or the second Q value, whether two or more than two synchronization signal blocks have a quasi co-location relationship, or determine a synchronization signal block index of a synchronization signal block.

In a possible design, when modulus values of candidate synchronization signal block indices of the two or more than two synchronization signal blocks by the first Q value or the second Q value are equal, or when remainders of the candidate synchronization signal block indices of the two or more than two synchronization signal blocks divided by the first Q value or the second Q value are equal, determine that the two or more than two synchronization signal blocks have a quasi co-location relationship.

In a possible design, the synchronization signal block index equals to a modulus value of a candidate synchronization signal block index of the synchronization signal block by the first Q value or the second Q value; or the synchronization signal block index equals to a remainder of the candidate synchronization signal block index of the synchronization signal block divided by the first Q value or the second Q value.

In a possible design, the first Q value belongs to a first set.

In a possible design, an element contained in a first set is a candidate value or any possible value of the first Q value. The element contained in the first set may be preset.

In a possible design, the second Q value belongs to a second set.

In a possible design, an element contained in the second set is a candidate value or any possible value of the second Q value. The element contained in the second set may be preset.

In a possible design, the second set is a subset or a complete set of the first set.

In a possible design, the second set at least contains: a maximum element in the first set, or a half of a maximum element in the first set.

In a possible design, when a maximum element in the second set is M, the second Q value includes: M/8, M/4, M/2 or M, where a value of M is any one of 16, 32 and 64.

In a possible design, when a maximum element in the second set is 16, the second Q value includes: 2, 4, 8 and 16;
when a maximum element in the second set is 32, the second Q value includes: 4, 8, 16 and 32;
when a maximum element in the second set is 64, the second Q value includes: 8, 16, 32 and 64.

In a possible design, when a maximum element in the second set is 12, the second Q value includes: 2, 3, 6 and 12;
when a maximum element in the second set is 18, the second Q value includes: 2, 4, 9 and 18; or, the second Q value includes: 3, 6, 9 and 18;
when a maximum element in the second set is 20, the first Q value includes: 2, 5, 10 and 20; or, the second Q value includes: 2, 4, 10 and 20;
when a maximum element in the second set is 24, the second Q value includes: 3, 6, 12 and 24; or, the second Q value includes: 2, 4, 12 and 24;
when a maximum element in the second set is 36, the second Q value includes: 4, 9, 18 and 36; or, the second Q value includes: 2, 6, 18 and 36;
when a maximum element in the second set is 48, the second Q value includes: 6, 12, 24 and 48; or, the second Q value includes: 4, 12, 24 and 48;
when a maximum element in the second set is 60, the second Q value includes: 6, 15, 30 and 60; or, the second Q value includes: 10, 20, 30 and 60.

In a possible design, the acquiring module 401 is specifically configured to acquire the second Q value based on MIB indication information.

In a possible design, the acquiring module 401 is specifically configured to acquire the first Q value based on SIB1 indication information.

The MIB indication information indicates which second Q value in a second set for a user equipment to use. Specifically, the MIB indication information is an index value of the second Q value in the second set;

The SIB1 indication information indicates which first Q value in a first set for the user equipment to use. Specifically, the SIB1 indication information is an index value of the first Q value in the first set.

In a possible design, when a maximum element in the first set is 16, the first Q value includes: 1, 2, 4, 8 and 16;
when a maximum element in the first set is 32, the first Q value includes: 1, 2, 4, 8, 16 and 32;
when a maximum element in the first set is 64, the first Q value includes: 1, 2, 4, 8, 16, 32 and 64.

In a possible design, when a maximum element in the first set is 12, the first Q value includes: 1, 2, 3, 4, 6 and 12;
when a maximum element in the first set is 18, the first Q value includes: 1, 2, 3, 6, 9 and 18;
when a maximum element in the first set is 20, the first Q value includes: 1, 2, 4, 5, 10 and 20;
when a maximum element in the first set is 24, the first Q value includes: 1, 2, 3, 4, 6, 8, 12 and 24;
when a maximum element in the first set is 36, the first Q value includes: 1, 2, 3, 4, 6, 9, 12, 18 and 36;
when a maximum element in the first set is 48, the first Q value includes: 1, 2, 3, 4, 6, 8, 12, 24 and 48;
when a maximum element in the first set is 60, the first Q value includes: 1, 2, 3, 4, 5, 6, 10, 15, 20, 30 and 60.

Each element in the first set is a factor of a maximum element in the first set (the maximum element in the first set is an integer multiple of an element in the first set).

Each element in the first set is a factor of a maximum element in the first set (the maximum element in the first set is an integer multiple of an element in the first set), and the maximum element in the first set equals to a maximum value of a time index carried in a PBCH DMRS.

In the embodiment, by means of acquiring a first Q value or a second Q value, determining, based on the first Q value or the second Q value, whether two or more than two synchronization signal blocks satisfy a quasi co-location relationship, or determining a synchronization signal block index of a synchronization signal block, the embodiments of the present disclosure allow a user equipment to accurately learn beam repetition information when there are many candidate synchronization signal block locations, and signaling overhead is reduced, thereby solving the problem of signaling overhead in the related art when there are many synchronization signal blocks.

Figure 5:
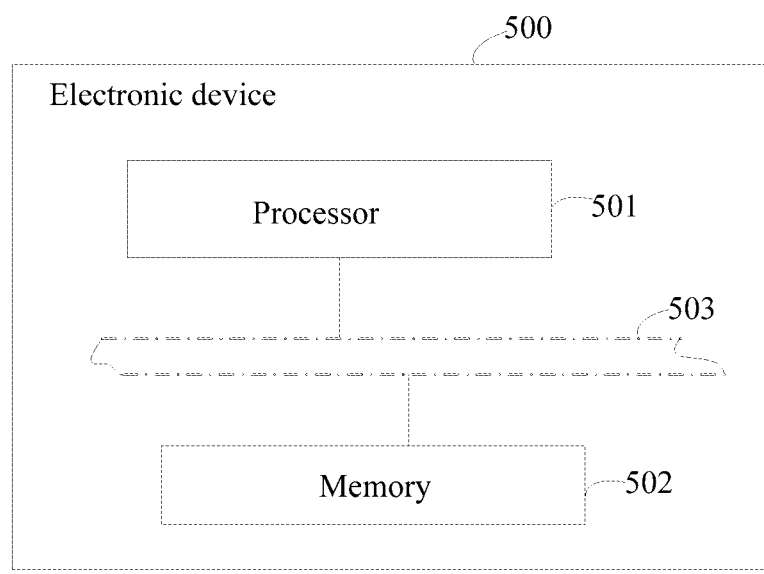
FIG. 5 is a schematic structural diagram of an electronic device according to a fourth embodiment of the present disclosure.

FIG. 5 is a schematic structural diagram of an electronic device according to a fourth embodiment of the present disclosure. As shown in FIG. 5, the electronic device 500 may include: at least one processor 501 and a memory 502.

The memory 502 is configured to store a program. Specifically, the program may include program codes, and the program codes include computer operable instruction.

The memory 502 may include a high-speed RAM memory, and may further include a non-volatile memory (non-volatile memory), such as at least one magnetic disk memory.

The processor 501 is configured to execute the computer executable instruction stored in the memory, such that the foregoing method is implemented.

The processor 501 may be a central processing unit (central processing unit, abbreviated as CPU), an application specific integrated circuit (Application Specific Integrated Circuit, abbreviated as ASIC), or one or more integrated circuits configured to implement the embodiments of the present disclosure.

Optionally, regarding the specific implementation, if the communication interface, the memory and the processor are implemented independently, the communication interface, the memory and the processor can be connected with each other and communicate with each other via a bus 503. The bus 503 may be an industry standard architecture (Industry Standard Architecture, abbreviated as ISA) bus, a peripheral component interconnect (Peripheral Component, abbreviated as PCI) bus, or an extended industry standard architecture (Extended Industry Standard Architecture, abbreviated as EISA) bus or the like. The bus 503 may include an address bus, a data bus, a control bus or the like, but it does not mean that there is only one bus or one type of bus.

Optionally, regarding the specific implementation, if the communication interface, the memory and the processor are integrated on a chip, the communication interface, the memory and the processor may implement communication via an internal interface.

The present disclosure further provides a computer-readable storage medium, which may include: a USB flash disk, a mobile hard disk, a read-only memory (ROM, Read-Only Memory), a random access memory (RAM, random access memory), a magnetic disk, an optical disk, or various types of media for storing program codes. Specifically, the computer-readable storage medium has stored therein a program instruction for implementing the method according to the foregoing embodiments.

The communication method and apparatus, the device and the storage medium according to the present disclosure are applied to a user equipment UE. By means of acquiring a first Q value or a second Q value, determining, based on the first Q value or the second Q value, whether two or more than two synchronization signal blocks have a quasi co-location relationship, or determining a synchronization signal block index of a synchronization signal block, a user equipment is enabled to accurately learn beam repetition information when there are many candidate synchronization signal block locations, and signaling overhead is reduced.

Finally, it should be noted that the foregoing various embodiments are only intended to explain, rather than to limit, the technical solution of the present disclosure. Although the present disclosure has been described in detail with reference to the foregoing embodiments, those ordinarily skilled in the art should understand that modifications can be made to the technical solution recorded in the forgoing embodiments, or some or all technical features thereof may be substituted by their equivalents, and such modifications or substitutions do not cause the essence of the technical solution to deviate from the scope of the technical solution in the embodiments of the present disclosure.

The invention claimed is:

1. A communication method applied to a user equipment (UE), comprising:
acquiring a first Q value or a second Q value;
based on the first Q value or the second Q value, determining whether two or more than two synchronization signal blocks have a quasi co-location relationship, or determining a synchronization signal block index of a synchronization signal block;
wherein the first Q value belongs to a first set, and when a maximum element in the first set is 64, the first Q value comprises: 32 and 64; or the second Q value belongs to a second set, and when a maximum element in the second set is 64, the second Q value comprises: 32 and 64.

2. The method according to claim 1, wherein,
if modulus values of candidate synchronization signal block indices of the two or more than two synchronization signal blocks by the first Q value or the second Q value are equal, or when remainders of the candidate synchronization signal block indices of the two or more than two synchronization signal blocks divided by the first Q value or the second Q value are equal, determining that the two or more than two synchronization signal blocks have the quasi co-location relationship.

3. The method according to claim 1, wherein:
the synchronization signal block index equals to a modulus value of a candidate synchronization signal block index of the synchronization signal block by the first Q value or the second Q value;
or the synchronization signal block index equals to a remainder of the candidate synchronization signal block index of the synchronization signal block divided by the first Q value or the second Q value.

4. The method according to claim 1, wherein an element contained in the first set is a candidate value of the first Q value.

5. The method according to claim 1, wherein an element contained in the second set is a candidate value of the second Q value.

6. The method according to claim 1, wherein the second set is a subset or a complete set of the first set.

7. The method according to claim 1, wherein the second set at least contains: the maximum element in the first set, or a half of the maximum element in the first set.

8. The method according to claim 1, wherein:
when the maximum element in the second set is 16, the second Q value comprises: 2, 4, 8 and 16;
when the maximum element in the second set is 32, the second Q value comprises: 4, 8, 16 and 32.

9. The method according to claim 1, wherein:
when the maximum element in the second set is 12, the second Q value comprises: 2, 3, 6 and 12;
when the maximum element in the second set is 18, the second Q value comprises: 2, 4, 9 and 18; or, the second Q value comprises: 3, 6, 9 and 18;
when the maximum element in the second set is 20, the second Q value comprises: 2, 5, 10 and 20; or, the second Q value comprises: 2, 4, 10 and 20;

when the maximum element in the second set is 24, the second Q value comprises: 3, 6, 12 and 24; or, the second Q value comprises: 2, 4, 12 and 24;

when the maximum element in the second set is 36, the second Q value comprises: 4, 9, 18 and 36; or, the second Q value comprises: 2, 6, 18 and 36;

when the maximum element in the second set is 48, the second Q value comprises: 6, 12, 24 and 48; or, the second Q value comprises: 4, 12, 24 and 48;

when the maximum element in the second set is 60, the second Q value comprises: 6, 15, 30 and 60; or, the second Q value comprises: 10, 20, 30 and 60.

10. The method according to claim 1, wherein acquiring the second Q value comprises:

acquiring the second Q value based on Master Information Block (MIB) indication information.

11. The method according to claim 1, wherein acquiring the first Q value comprises:

acquiring the first Q value based on System Information Block 1 (SIB1) indication information.

12. The method according to claim 1, wherein:

when the maximum element in the first set is 16, the first Q value comprises: 1, 2, 4, 8 and 16;

when the maximum element in the first set is 32, the first Q value comprises: 1, 2, 4, 8, 16 and 32.

13. The method according to claim 1, wherein:

when the maximum element in the first set is 12, the first Q value comprises: 1, 2, 3, 4, 6 and 12;

when the maximum element in the first set is 18, the first Q value comprises: 1, 2, 3, 6, 9 and 18;

when the maximum element in the first set is 20, the first Q value comprises: 1, 2, 4, 5, 10 and 20;

when the maximum element in the first set is 24, the first Q value comprises: 1, 2, 3, 4, 6, 8, 12 and 24;

when the maximum element in the first set is 36, the first Q value comprises: 1, 2, 3, 4, 6, 9, 12, 18 and 36;

when the maximum element in the first set is 48, the first Q value comprises: 1, 2, 3, 4, 6, 8, 12, 24 and 48;

when the maximum element in the first set is 60, the first Q value comprises: 1, 2, 3, 4, 5, 6, 10, 15, 20, 30 and 60.

14. The method according to claim 1, wherein each element in the first set is a factor of the maximum element in the first set.

15. The method according to claim 1, wherein each element in the first set is a factor of the maximum element in the first set, and the maximum element in the first set equals to a maximum value of a time index carried in a Physical Broadcast Channel Demodulation Reference Signal (PBCH DMRS).

16. An electronic device, comprising: a memory and a processor; wherein the memory has stored therein a computer program, and the processor is configured to call the computer program in the memory to perform the following operations:

acquiring a first Q value or a second Q value;

based on the first Q value or the second Q value, determining whether two or more than two synchronization signal blocks have a quasi co-location relationship, or determining a synchronization signal block index of a synchronization signal block;

wherein the first Q value belongs to a first set, and when a maximum element in the first set is 64, the first Q value comprises: 32 and 64; or the second Q value belongs to a second set, and when a maximum element in the second set is 64, the second Q value comprises: 32 and 64.

17. A non-transitory storage medium in which a computer program is stored, wherein the program is executed by a processor to perform the following operations:

acquiring a first Q value or a second Q value;

based on the first Q value or the second Q value, determining whether two or more than two synchronization signal blocks have a quasi co-location relationship, or determining a synchronization signal block index of a synchronization signal block;

wherein the first Q value belongs to a first set, and when a maximum element in the first set is 64, the first Q value comprises: 32 and 64; or the second Q value belongs to a second set, and when a maximum element in the second set is 64, the second Q value comprises: 32 and 64.

* * * * *